United States Patent
Shimizu et al.

(10) Patent No.: US 6,749,280 B2
(45) Date of Patent: Jun. 15, 2004

(54) RECORDING APPARATUS, RECORDING METHOD THEREFOR AND PROGRAM THEREFOR

(75) Inventors: Tohru Shimizu, Kanagawa (JP); Daisuke Tatsumi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 21 days.

(21) Appl. No.: 10/318,215

(22) Filed: Dec. 13, 2002

(65) Prior Publication Data

US 2003/0112293 A1 Jun. 19, 2003

(51) Int. Cl.[7] .............................. B41J 2/205; B41J 2/21
(52) U.S. Cl. ............................................ 347/15; 347/43
(58) Field of Search .............................. 347/15, 43, 19; 358/1.9, 3.01, 3.09, 515, 525

(56) References Cited

U.S. PATENT DOCUMENTS 6,323,957 B1 * 11/2001 Ball .............................. 358/1.9
6,543,870 B1 * 4/2003 Kakutani ..................... 347/15

FOREIGN PATENT DOCUMENTS

| JP | 6106736 | 4/1994 | |
|----|---------|--------|---|
| JP | 11314382 | 11/1999 | |
| JP | 2002368999 A | * 12/2002 | .......... H04N/1/405 |

* cited by examiner

Primary Examiner—Thinh Nguyen
(74) Attorney, Agent, or Firm—Morgan, Lewis & Bockius LLP

(57) ABSTRACT

Coordinates in an image and its corresponding color-converted data are supplied to a control/operation portion for every pixel. Quantization is applied to each color. The quantization is carried out so that a kind of dot for at least one color is made different from kinds of dots for the others in one and the same pixel when dots for different colors are superimposed on the pixel. The control/operation portion refers to a two-dimensional matrix on the basis of the quantization result, determines an output dot for each color, and converts the data into data which can be processed by a printer. The printer records an image based on the quantization result while reciprocating a recording head. Thus, it is possible to reduce color shift caused by the difference of the ink landing order at the time of reciprocating the head for recording.

18 Claims, 10 Drawing Sheets

(1) IN CASE OF SCANNING IN FORWARD DIRECTION

YELLOW GREEN

GREEN YELLOW

GREEN SIMILAR TO HUE OF DOT HAVING HIGH DENSITY (2) IN CASE OF SCANNING IN REVERSE DIRECTION

CYANIC GREEN

GREEN CYAN

GREEN SIMILAR TO HUE OF DOT HAVING HIGH DENSITY

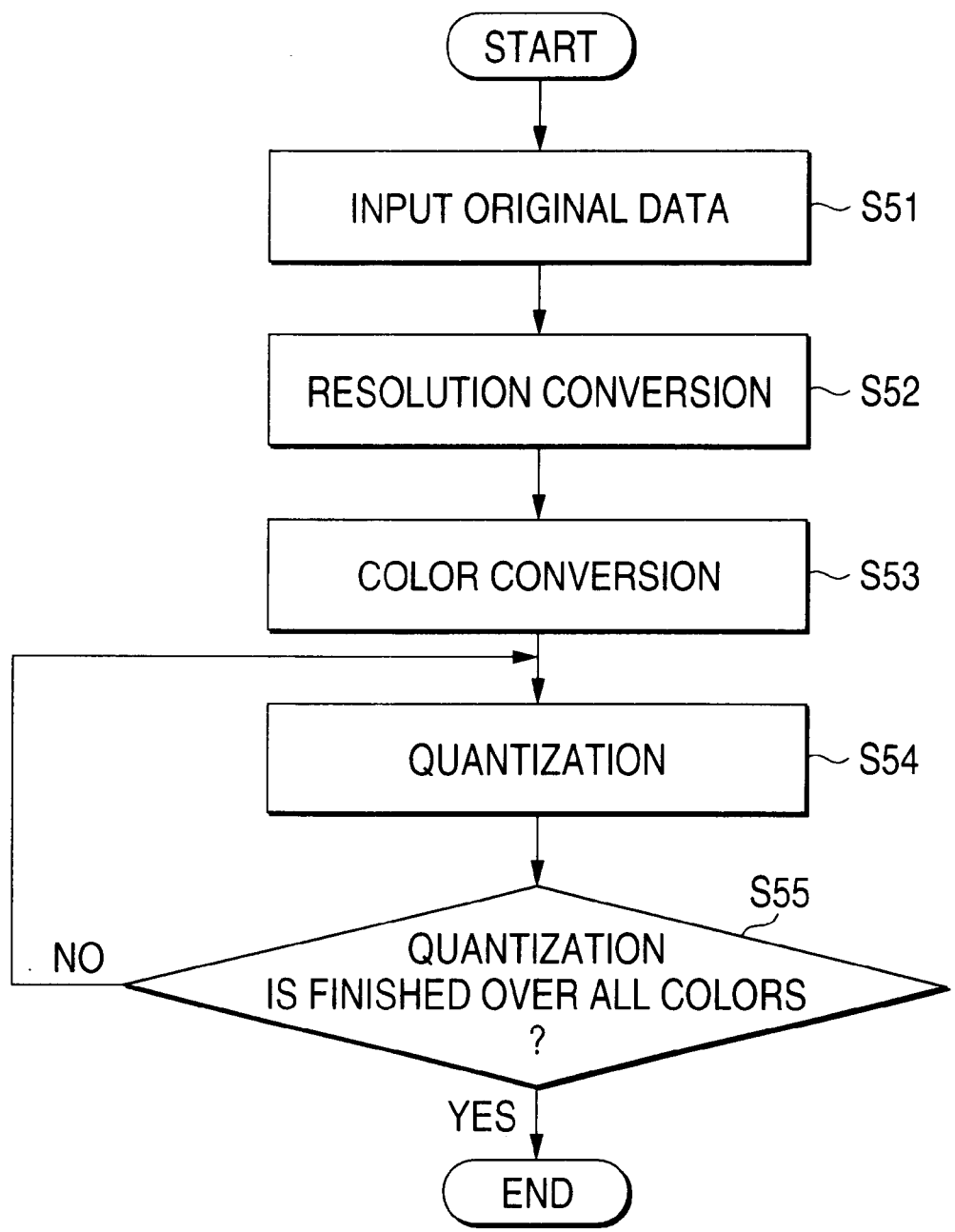

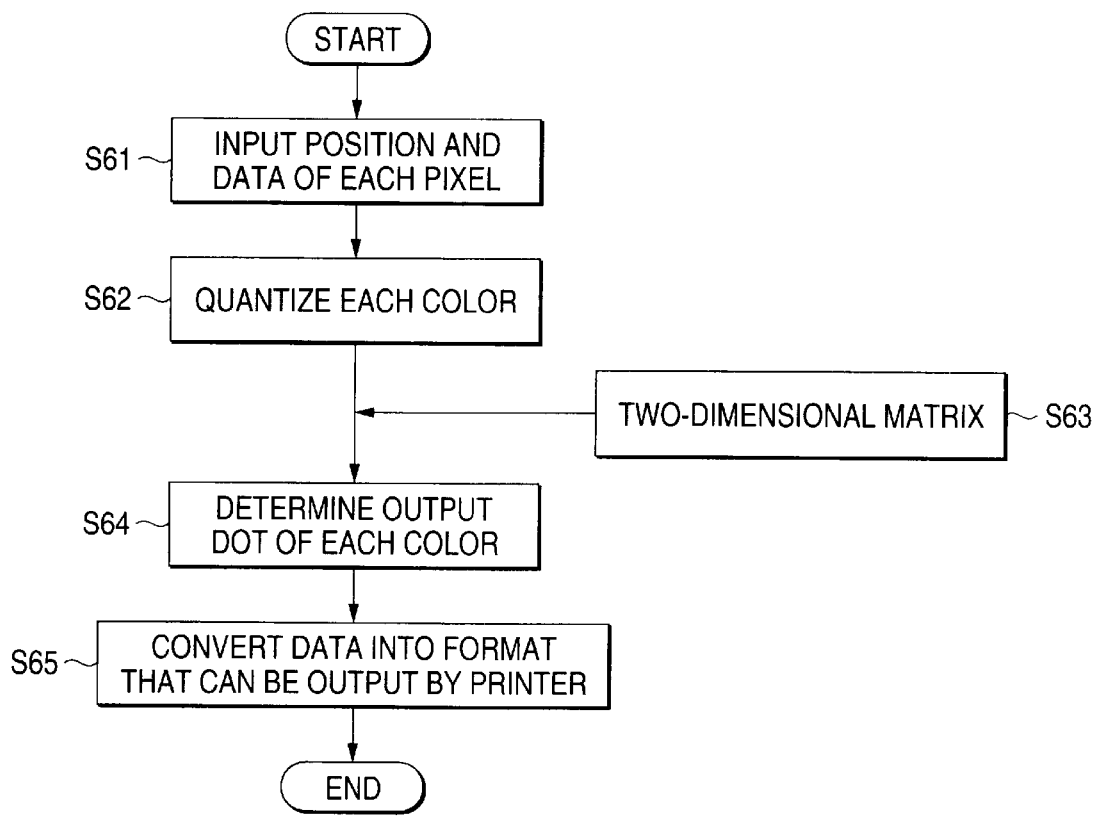

| GROUP | CYAN | MAGENTA | YELLOW | BLACK |
|---|---|---|---|---|
| 0 | HIGH | LOW | MIDDLE HIGH | MIDDLE LOW |
| 1 | MIDDLE HIGH | MIDDLE LOW | LOW | HIGH |
| 2 | LOW | HIGH | MIDDLE LOW | MIDDLE HIGH |
| 3 | MIDDLE LOW | MIDDLE HIGH | HIGH | LOW |

*FIG. 15*

| BEFORE REPLACEMENT | | | AFTER REPLACEMENT | | | |
|---|---|---|---|---|---|---|
| LARGE | LARGE | SMALL | MIDDLE | MIDDLE | SMALL | 1 |
| | | | MIDDLE | MIDDLE | NONE | 1 |
| LARGE | LARGE | NONE | LARGE | SMALL | NONE | 1 |
| | | | SMALL | LARGE | NONE | 1 |
| | | | MIDDLE | MIDDLE | NONE | 1 |
| LARGE | MIDDLE | SMALL | LARGE | MIDDLE | SMALL | 1 |
| | | | MIDDLE | SMALL | SMALL | 1 |
| | | | MIDDLE | SMALL | NONE | 1 |
| LARGE | MIDDLE | NONE | LARGE | MIDDLE | NONE | 1 |
| | | | MIDDLE | SMALL | NONE | 1 |
| LARGE | SMALL | SMALL | LARGE | SMALL | SMALL | 5 |
| | | | MIDDLE | NONE | NONE | 3 |
| MIDDLE | MIDDLE | MIDDLE | MIDDLE | MIDDLE | MIDDLE | 1 |
| | | | MIDDLE | SMALL | SMALL | 1 |
| | | | SMALL | MIDDLE | SMALL | 1 |
| | | | SMALL | SMALL | MIDDLE | 1 |
| MIDDLE | MIDDLE | SMALL | MIDDLE | MIDDLE | SMALL | 5 |
| | | | SMALL | SMALL | NONE | 1 |
| | | | SMALL | NONE | SMALL | 1 |
| | | | NONE | SMALL | SMALL | 1 |

RECORDING APPARATUS, RECORDING METHOD THEREFOR AND PROGRAM THEREFOR

The present disclosure relates to the subject matter contained in Japanese Patent Application No. 2001-381672 filed on Dec. 14, 2001, which is incorporated herein by reference in its entirety.

BACKGROUND OF THE INVENTION

1. Field of the Invention

The present invention relates to a recording apparatus, a recording method therefor and a program therefor, and particularly relates to a recording apparatus for printing a multi-gradation image by forming three or more kinds of dots different in density per unit area by means of area coverage modulation, density modulation, or mixture of those gradations; a recording method for the recording apparatus; and a program for the recording apparatus.

2. Description of the Related Art

A color ink jet printer having inks of a plurality of colors has been proposed as one of digital color image output apparatuses. The color ink jet printer has been used broadly for printing images. In the ink jet printer, ink particles ejected from a plurality of nozzles integrally arrayed in a head are landed on a printing medium such as a sheet of paper while the head is moved in a direction (main-scanning direction, first scan direction) perpendicular to a direction (sub-scanning direction, slow scan direction) in which the printing medium is fed. Thus, ink dots ate formed to record an image. Black (K), cyan (C), magenta (M) and yellow (Y) are used as the basic colors of the inks.

In such an ink jet printer, in order to improve the printing speed, bi-directional printing is performed in which ink is ejected in both the forward direction and the reverse direction of the head while the head is moved in the main-scanning direction. In the case of the bi-directional printing, the inks of K, C, M and Y are landed on the printing medium in that order in the forward direction. On the contrary, the inks of Y, M, C and K are landed on the printing medium in that order in the reverse direction.

Due to the difference in color order in which the inks are landed, there is a problem that there is a slight variation in hue for the following reason. That is, when blue (B) is formed out of the inks of C and M, there is a slight difference in hue between B formed out of C and M in that color order in the forward direction and B formed out of M and C in that color order in the reverse direction. As a result, there occurs a problem that B different in hue like stripes in the sub-scanning direction is printed though B uniform in hue should be printed essentially. This phenomenon refers to color shift caused by the difference in color order in which the inks are landed. In a one-path bidirectional printing, width of the stripe is as long as length of the nozzle line so that the color shift becomes distinctly visible. This is a big problem. Incidentally, the one-path bidirectional printing performs recording in one path in the main scanning direction with respect to a region having the same length as the nozzle line and transfers a recording paper by the length of the nozzle. Subsequently, the one-path bidirectional printing repeats to perform recording in one path in an opposite direction to the previous path with respect to another area having the same length as the nozzle line.

The principle that the hue changes due to the difference in the color order in which the inks are landed will be described using the case where B is formed out of C and M. In a printing medium into which the inks easily infiltrate, the C ink landed first stays in the surface and inside of the recording medium, and the M ink landed next comes around to the lower side of the C ink and permeates the recording medium. Thus, the hue becomes rich in C landed first. That is, in the printing medium into which the inks easily infiltrate, the color of the ink landed first becomes dominant.

On the other hand, in a printing medium into which the inks hardly infiltrate, the C ink landed first stays in the surface of the medium, and the M ink landed next stays on the C ink or flows to a portion where the C ink is not put. Thus, the hue becomes rich in M landed later. That is, in the printing medium into which the inks hardly infiltrate, the color of the ink landed later becomes dominant.

There have been proposed several methods for avoiding such a change in hue, in JP-A-Hei.6-106736 in which a plurality of recording pixels are allocated to every pixel of data, and in JP-A-Hei.11-314382 in which a color conversion table is changed.

In addition, in JP-A-Hei.6-106736, one pixel of mixed color is expressed by a plurality of pixels of simple colors (for example, one pixel of red is expressed by two pixels of magenta and yellow not overlapping each other). Therefore, there is such a problem that the dimensions of image data are doubled lengthwise and widthwise or the density is made half However, there are further problems in the recording methods in the related art as follows. That is, the recording methods require information about the scanning direction of the head. In addition, different processes have to be applied to a recording area at the time of outward scanning of the head and a recording area at the time of homeward scanning of the head, respectively so that the color in the former recording area is in agreement with the color in the latter recording area.

Also, in JP-A-Hei.6-106736, a mixed color in a single pixel is represented by a plurality of pixels each having single color (for example, red in a single pixel is represented by two pixels which have magenta and yellow, respectively, without overlapped each other). Therefore, the size of image data becomes twice in lengthwise and breadthwise directions and/or density is reduced to half. These are also problems.

SUMMARY OF THE INVENTION

It is an object of the invention to provide a recording apparatus in which, when forming a color image on a recording medium while repeating reciprocating motion of a head, it is not necessary to take the scanning direction of the head into consideration for quantizing image data and to change the size of an image, and it is possible to prevent the reduction of the density and to reduce color shift caused by the difference of the order in which dots of a plurality of colors are landed, so that the image quality can be improved; a recording method for the recording apparatus; and a program for the recording apparatus.

In order to solve the foregoing problems, according to a first aspect of the invention, there is provided a recording apparatus including a recording head, an input section, and a quantization section. The recording head can form a plurality of kinds of dots, which are different from each other in density, per unit area for every single color by means of at least one of area coverage modulation and density modulation. The recording head ejects a plurality of colors. The input section inputs image data having a gradation value for every pixel. The quantization section quantizes the inputted image data so that number of pixels in which the kind of dot for at least one color is different from the kinds or dots for the other colors in one and the same pixel is higher than number of pixels on which dots having the same kind are superimposed and macroscopic hue is equal to a case in which dots having the same kind are superimposed in all pixels. The recording head is reciprocated to record on a recording medium based on a quantization result obtained by the quantization section.

According to the first aspect, the input section inputs image data having a gradation value for every pixel. The is quantization section quantizes the image data inputted by the input section. At this time, the quantization section quantizes the inputted image data so that number of pixels in which the kind of dot for at least one color is different from the kinds of dots for the other colors in one and the same pixel is higher than number of pixels on which dots having the same kind are superimposed and macroscopic hue is equal to a case in which dots having the same kind are superimposed in all pixels. In other words, the quantization is carried out so as to suppress the number of pixels in which dots having the same density are superimposed or dots having the same size are superimposed. Then, A recording medium is recorded based on the result of the quantization by the quantization section while the recording head repeatedly reciprocate, which can form a plurality of kinds of dots, which are different from each other in density, per unit area for every single color by means of at least one of area coverage modulation and density modulation. Incidentally, the macroscopic hue refers to the hue of the following single color When an ensemble of a large number of minute pixels including a plurality of colors are looked from a normal visual distance by naked eye, the ensemble is recognized a single color due to the integration effect of naked eye.

With this construction, it is prevented to superimpose the dots for different colors having the same kind on one and the same pixel. When kinds (density or area such as dot size) of dots for a plurality of colors, which form one pixel, are different, color forming a dot having large area or high density has a strong influence. For example, cyan has a strong influence in a pixel formed of a large droplet of cyan and a small droplet of magenta. Also, magenta has a strong influence in a pixel formed of a small droplet of cyan and a large droplet of magenta. These facts don't depend on color order in which the droplets are landed on a recording medium. Therefore, the color shift caused by difference in color order in which dots are landed between a time when the head scans in a forward direction and a time when the head scans in a reverse direction can be reduced.

Also, the quantization is carried out so that macroscopic hue is equal to a case in which dots having the same kind are superimposed in all pixels. Therefore, it is not necessary to change the size of an image and reduction in density also can be suppressed.

According to a second aspect of the invention, the quantization section quantizes the inputted image data so that the number of pixels in which the kind of dot for at least one color is different from the kinds of dots for the other colors in one and the same pixel is higher than number of pixels in which dots each having higher density than a predetermined density are superimposed.

According to a third aspect of the invention, the quantization section quantizes the inputted image data so that the pixels in which the kind of dot for at least one color is different from the kinds of dots for the other colors in one and the same pixel is not arrange in a deviation manner.

According to a fourth aspect of the invention, the quantization section quantizes the inputted image data so that the pixels in which the kind of dot for at least one color is different from the kinds of dots for the other colors in one and the same pixel are arranged two-dimensionally without deviation while number of dots for each color in the pixels and number of dots for each kind in the pixels are not changed.

According to a fifth aspect of the invention, the quantization section carries out second quantization by redetermining a kind of dot for each color with reference to a first quantization result.

According to a sixth aspect of the invention, in the second quantization, a kind of dot for each color is redetermined based on a dot redetermination ratio, which is prepared in advance, so that the macroscopic hue is equal to the case in which dots having the same kind are superimposed in all pixels.

A recording method according to the invention can be applied to the recording apparatus according to the first to sixth aspects of the invention. Similarly, a program according to the invention also can be applied to the recording apparatus according to the first to sixth aspects of the invention.

BRIEF DESCRIPTION OF THE DRAWINGS

FIG. 6 is a flow chart showing a quantized data generating process routine according to a first embodiment of the invention.

FIG. 7 is a flow chart showing a quantization process according to the first embodiment of the invention.

FIG. 8 is a plan view showing an embodiment of Bayer type dither matrix as a two-dimensional matrix used in this embodiment.

FIG. 15 is a plan view showing a method for replacing a combination of dots as to pixels having a large quantity of an ink shot per pixel.

DETAILED DESCRIPTION OF THE PREFERRED EMBODIMENTS

Figure 1A:
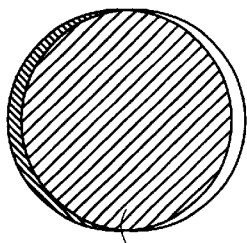
FIG. 1 is a plan view for explaining a basic principle of the invention.
Figure 1B:
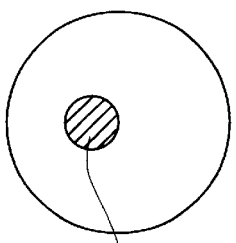
Figure 1C:
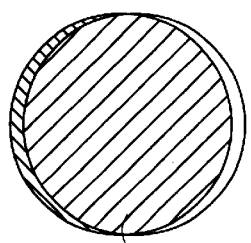
Figure 1D:
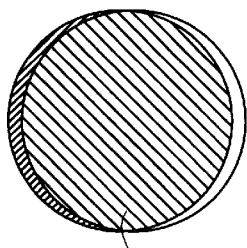
Figure 1E:
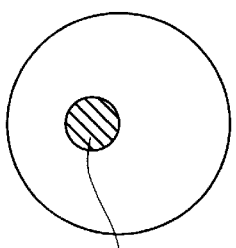
Figure 1F:
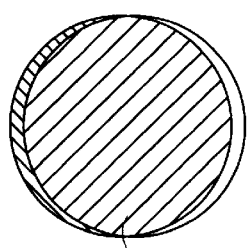

Before embodiments of the invention are described, basic principle of the invention will be described. The color shift caused by the difference in color order in which dots are landed at a time, of the bidirectional printing is caused at a portion where the dots are overlapped each other (see FIGS. 1A, 1B, 1C, and 1D). For example, as shown in FIGS. 1A and 1D in which cyan and yellow are exemplified, the forward direction and the reverse direction are different in the color order in which cyan and yellow are landed so that color of the overlapped portion is yellow green in the forward direction and the color of the overlapped portion is cyanic green in the reverse direction. The more similar the hue of the overlapped dot is to the primary color (for example, cyan, magenta, and yellow), the less conspicuous the color shift is. Therefore, when the quatization processing (halftone processing) is performed so that it is difficult to superimpose dots having high gradation each other (in an area coverage modulation printer, the dots having high gradation refers to large dots and in a density modulation printer, that refers to dots having high density), the color shift caused by the difference in color order in which the inks are landed can be reduced. The description will be made in more detail. In the area coverage modulation printer, the quantization is performed so that pixels in which large dots are overlapped each other (see FIGS. 1A and 1D) are reduced and pixels in which a large dot and a small dot are overlapped, that is, pixels in which a overlapped portion between the large, dot and the small dot (see FIGS. 1B and 1E) is small is increased. In the density modulation printer, the quantization is performed so that pixels in which dots having high gradation are superimposed each other (see FIGS. 1A and 1D) are reduced and pixels in which a dot having high gradation and a dot having low gradation are overlapped, that is, pixels in which pixels similar to the hue of the dot having high gradation (primary color) (see FIGS. 1C and 1F) are increased. In other words, when the quantization is performed so that number of pixels in which at least one dot (density or size of a dot) is different from dots of other colors in kinds of a dot (density or size of a dot) is higher than number of pixels in which dots having the same kind are overlapped each other, it is difficult that the color shift caused by the difference in color order in which the inks are landed becomes conspicuous. This effect is the most effective in case that the dots having high gradations in said pixel, the number of which is reduced, are dots each having highest gradations (that is, the largest dots in the area coverage modulation printer and dots having the highest density in the density modulation printer). However, when the above mentioned processing is simply performed, the hue is changed in comparison with an original image. Therefore, in embodiments of the invention, even it the above mentioned quantization is performed, each of pixels are arranged so that macroscopic difference in hue is lessen.

In order to realize the above mentioned arrangement of dots, for example, in pixels includes M×N two-dimensional, when n% of pixels in which a cyan dot and a magenta dot each having high gradation are overlapped (referred to as high-C high-M pixels) are changed to pixels in which a cyan dot having high gradation and a magenta dot having low gradation are overlapped (referred to as high-C low-M pixels), n% of the high-C high-M pixels are also changed to the low-C high-M pixels In a first embodiment (described later), this method will be described.

Also, when the macroscopic hue is not different, it is possible to perform replacement in a complex manner in stead of the above mentioned replacement with the simple combinations (high-and-high is replaced with high-and-low or low-and-high) and the same number. In a fourth embodiment (described later), this method will be described.

Also, preferably, the arrangement of pixels in which a dot having high gradation and a dot having low gradation is not deviated. Incidentally, "deviated" or "deviated arrangement" means pixels including the same combination of dots (for example, the same kinds of dots for the same colors) are arranged closely. Because, it the arrangement is deviated and output is performed in low resolution, there is fear that the color shift is detected. In second and third embodiments (described later), this method will be described.

Next, embodiment's of a recording apparatus, a recording method therefor and a program therefor according to the invention will be described in detail with reference to the accompanying drawings. FIGS. 2 to 15 show embodiments of a recording apparatus, a recording method therefor and a program therefor according to the invention.

At first, a printing system and a printer, which are common in the first to fourth embodiments, will be given.

Figure 2:
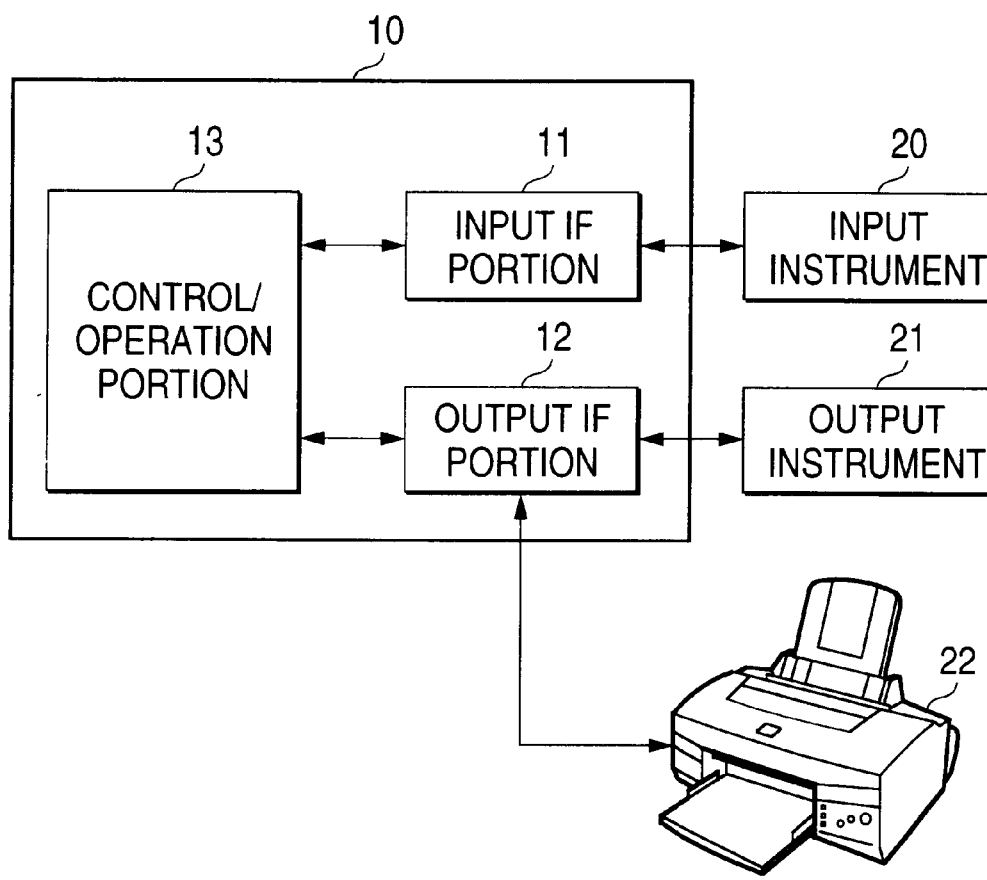
FIG. 2 is a block diagram showing the schematic configuration of a printing system to which a printing apparatus according to an embodiment of the invention has been applied.

FIG. 2 is a block diagram showing the schematic configuration of a printing system to which a printing apparatus according to an embodiment of the invention has been applied. Connected to a computer 10 are an input instrument 20, an output instrument 21 including a printer 22 as a printing apparatus, a not-shown storage instrument and a not-shown communication instrument. An input IF portion 11 and an output IF portion 12 control data transferred between the various instruments and the computer 10. A control/operation portion 13 administers various processes concerning printing and carried out in the computer 10.

Figure 3:
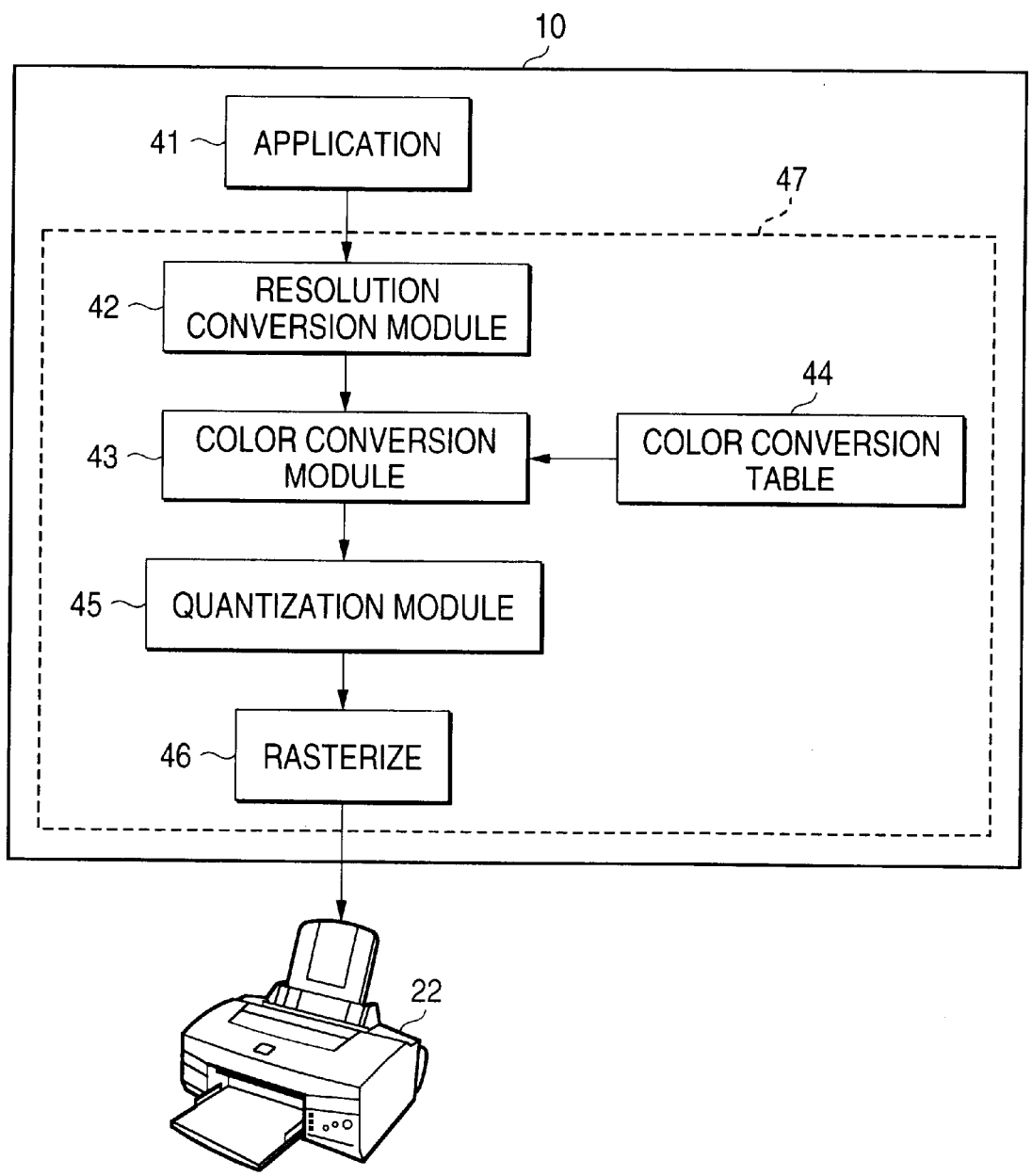
FIG. 3 is a block diagram showing the software configuration of the printing system in FIG. 2.

FIG. 3 is a block diagram showing the software configuration of the printing system.

When a printing instruction is issued from an application program 41, a printer driver 47 of the computer 10 receives data, and outputs the data converted into a data format that can be printed by the printer 22.

When the printer driver 47 receives the data from the application program 41, a resolution conversion module 42 in the printer driver 47 first starts processing. The resolution conversion module 42 plays a role of converting the resolution to be able to be output by the printer 22. A color conversion module 43 converts the color of the data in accordance with a color conversion table 44. The color conversion table 44 is made up and saved separately so that the color property carried by image data matches with the color property expressed by the printer 22. As for a specific color configuration, the color conversion table 44 plays a role of converting image data composed of red (R), green (G) and blue (B) into data matched with colors that can be expressed in the combination of inks of cyan (C), magenta (M), yellow (Y) and black (B) by the printer 22. A quantization module 45 plays a role of quantization of the data into a quantization number that can be expressed by the printer 22. A rasterizer 46 plays a role of replacing the quantized data quantized in the quantization module 45 with data to be transferred to the printer 22. After the replacement, the rasterizer 46 transfers the data to the printer 22.

Figure 4:
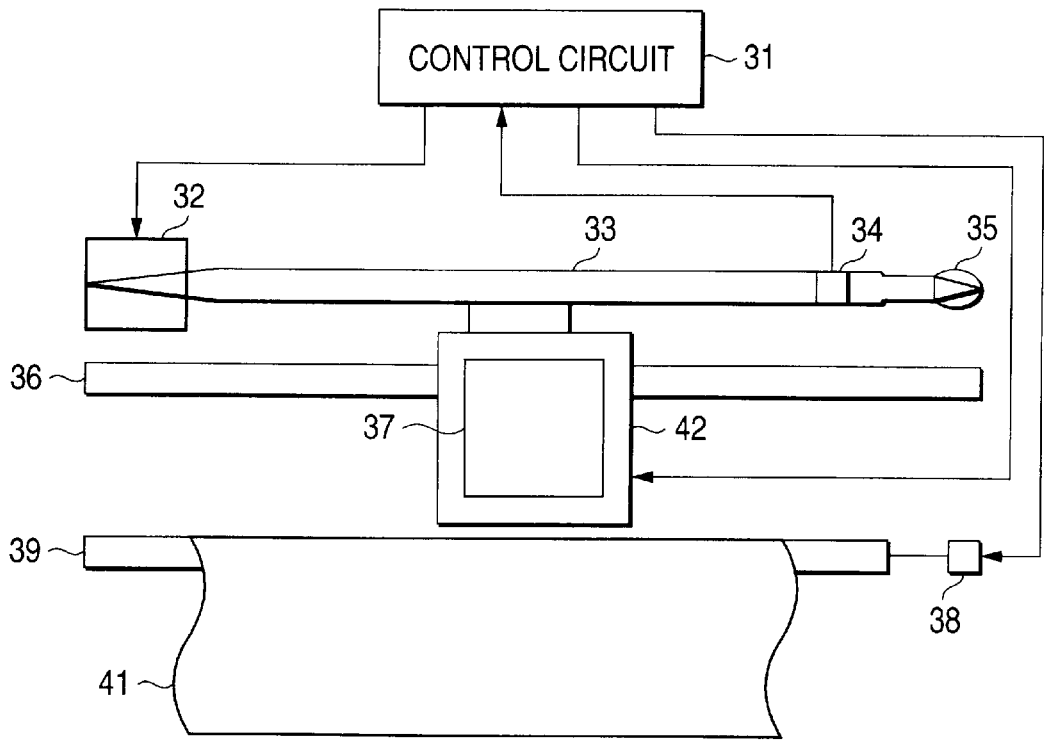
FIG. 4 is a schematic configuration diagram of a printer applied in this embodiment.

FIG. 4 is a schematic configuration diagram of a printer as a printing apparatus applied to this embodiment.

The printer includes a control circuit 31 for administering main control; a carriage motor 32; a driving belt 34 to which a part of a carriage 33 is fixed at a predetermined positions and which is laid between a rotating shaft of the carriage motor 32 and a pulley 35; a shaft 36 for supporting the conveyance of the carriage 33; a position detection sensor 37 for detecting a starting point of the carriage 33; a mechanism for conveying a printing medium 40 by means of a paper feed motor 38 and a platen 39; and a mechanism for driving a printing head portion 41 mounted on the carriage 33 so as to eject inks.

The carriage motor 32, the driving belt 34, the pulley 35, the shaft 36 placed in parallel with a shaft of the platen 39, and the position detection sensor 37 constitutes a mechanism for reciprocating the carriage 33 in the axial direction of the platen 39. That is, the driving belt 35 moves in a direction corresponding to the rotating direction of the carriage motor 32 so that the carriage 33 and the printing head portion 41 are guided by the shaft 36 so as to be conveyed in a direction (forward direction) toward the position where the carriage 32 is placed or in a direction (reverse direction) toward the position where the pulley 35 is placed.

Upon reception of information about the recording direction and the quantities of ejected inks of C, M, Y and K from the computer 10, which is a recording pattern generating portion, the control circuit 31 executes a recording process. The printing medium 40 is conveyed in a direction (sub-scanning direction) perpendicular to the conveying direction (forward direction or reverse direction) of the carriage 33 and the printing head portion 41 which direction is a main-scanning direction.

Figure 5:
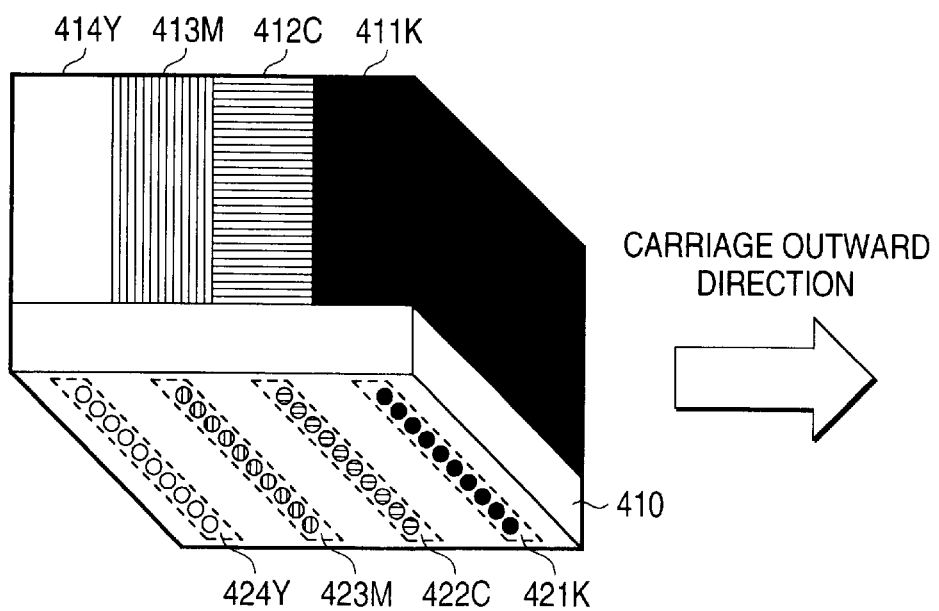
FIG. 5 is a perspective view of the configuration of a printing head portion viewed from its oblique lower side (printing medium side).

FIG. 5 is a perspective view of the configuration of the printing head portion viewed from its oblique lower side (printing medium side). In FIG. 5, the printing head portion includes a head body 410, a cartridge 411K for black ink, and cartridges 412C, 413M and 414Y for color inks of C, M and Y. The cartridges 411K, 412C, 413M and 414Y are placed on the top of the head body 410. The head body 410 is mounted with nozzle arrays 421K, 422C, 423M and 424Y corresponding to the colors of the inks in the ink cartridges on the top of the head body 410.

Each nozzle array includes a plurality of nozzles arrayed in the direction in which the printing medium 40 is fed. In addition, the nozzle arrays 421K, 422C, 423M and 424Y are arrayed in a direction perpendicular to the direction in which the printing medium 40 is fed (that is, in the direction in which the carriage 33 moves). In FIG. 5, Y (nozzle array 424Y), M (nozzle array 423M), C (nozzle array 422C) and K (nozzle array 421K) line up in that order from the left. In addition, in FIG. 5, assume that the forward direction is a direction to move from the left to the right while the reverse direction is a direction to move from the right to the left. Then, the inks of K, C, M and Y are landed on the printing medium 40 in that order in the forward direction while the inks of Y, M, C and K are landed thereon in that order in the reverse direction.

Inside the head body 410, inks are supplied from the cartridges 411K, 412C, 413M and 414Y to the nozzle arrays 421K, 422C, 423M and 424Y, respectively. Each of the nozzles constituting the nozzle arrays 421K, 422C, 423M and 424Y is provided with a piezoelectric element (not shown).

The piezoelectric element has a characteristic that its shape is changed in response to a voltage applied thereto, as known well. By use of this change in shape, ink in the ink cartridge located in the upper portion is ejected from the nozzle so as to form a dot on the printing medium. Thus, printing (recording) is performed. By controlling such a change in shape of the piezoelectric element, the dimensions of the dot can be controlled.

Incidentally, a system provided with a head for ejecting inks using piezoelectric elements is adopted in this embodiment. However, a printing apparatus for ejecting inks in another method may be used. For example, the invention is also applicable to a printing apparatus for ejecting inks by means of bubbles generated due to heat applied to the vicinities of nozzles (the dimensions of dots are controlled in accordance with the difference of the quantity of heat applied).

<First Embodiment>

Next, description will be made on a process for generating multivalued quantized data for printing in the printer. FIG. 6 is a flow chart showing a quantized data generating process routine according to a first embodiment of the invention, which is a processing executed by the control/operation portion 13 in the computer 10 shown in FIG. 2.

First, when the quantized data generating process is started, original data is supplied to the control/operation portion 13 (Step S51). The original data has a gradation number on a scale of 0 to 255 for each color of R, G and B per pixel. The original data may have any resolution.

The control/operation portion 13 converts the resolution of the input original data into a resolution for printing in the printer (Step S52). Incidentally, in accordance with some user's request or some resolution of input data, printing may he carried out without executing this resolution conversion process.

Further, the control/operation portion 13 carries out a color conversion process (Step S53). The color conversion process means a process for converting data composed of the three colors R, G and B into data composed of C, M, Y and K. The color conversion process is executed with a color conversion table LUT in which a combination corresponding to the properties of C, M, Y and K in the printer has been stored in advance.

The number of gradations that can be expressed by a printer is generally smaller than the number of gradations belonging to original data. For example, the number of gradations belonging to original data as typified by a bmp file is 256 per each of R, G, and B while the number of gradations that can be expressed at most by a printer is often smaller than 10. Therefore, the control/operation portion 13 carries out a quantization process upon the data subjected to the color conversion process, so that the number of gradations of the data is reduced to the number of gradations that can be expressed by the printer (Step S54).

A feature of the printer according to the embodiments of the invention is to perform the quantization process to change the 256 gradations belonging to the original data to the number of gradations that can be expressed by the printer.

The quantization process is applied to the data of all the colors C, M, Y and K made up after the color conversion process in Step S53, and the quantization process is continued till the quantization process is terminated on all the colors (Step S55). The quantized data is converted into a data format that can be processed by the printer, and then transferred to the printer.

<First Embodiment>

The quantization process according to the first embodiment of the invention will be described below.

Description will be made on a configuration including a secondary color formed of cyan and magenta by way of example. Assume that two kinds of dot sizes, a large droplet and a small droplet, are formed of each color. In other words, the printer can express three kinds of gradations, "no dot formation (no droplet)", "small droplet formation" and "large droplet formation". Not to say, the three kinds of gradations that can be expressed by the printer may be attained by use of different ink densities such as "no dot formation (no droplet)", "low density ink formation" and "high density ink formation", or by use of a combination of the dot size and the ink density.

FIG. 7 is a flow chart showing the quantization process according to the first embodiment of the invention. First, coordinates in an image and color-converted data are supplied to the control/operation portion 13 for every pixel (Step S61).

Next, the control/operation portion 13 applies quantization to each color (Step S62). A quantization method generally known, such as an error diffusion method or a dither method, may be used for this quantization. For example, the error diffusion method and the dither method are disclosed in "Fine Imaging and Hard Copy", pp.p15–19, edited by The Society of Photographic Science and Technology of Japan and others (Corona Publishing Co., Ltd.). Thus, description on such methods is omitted here.

Next, the control/operation portion 13 determines an output dot for each color on the basis of the quantization result (Step S64). Assume that the quantization result is used directly as the output dot when there is a difference in kind of dot between cyan and magenta as a result of the quantization. On the other hand, the quantization result is changed to obtain an output dot when there is no difference in kind of dot between cyan and magenta as a result of the quantization. The invention has a feature in this changing method which results in reduction of color shift caused by the difference of the order in which dots of the two colors are landed. Here, description will be made on a method for referring to a two-dimensional matrix (Step S63) to determine an output dot for each color.

Figure 9:
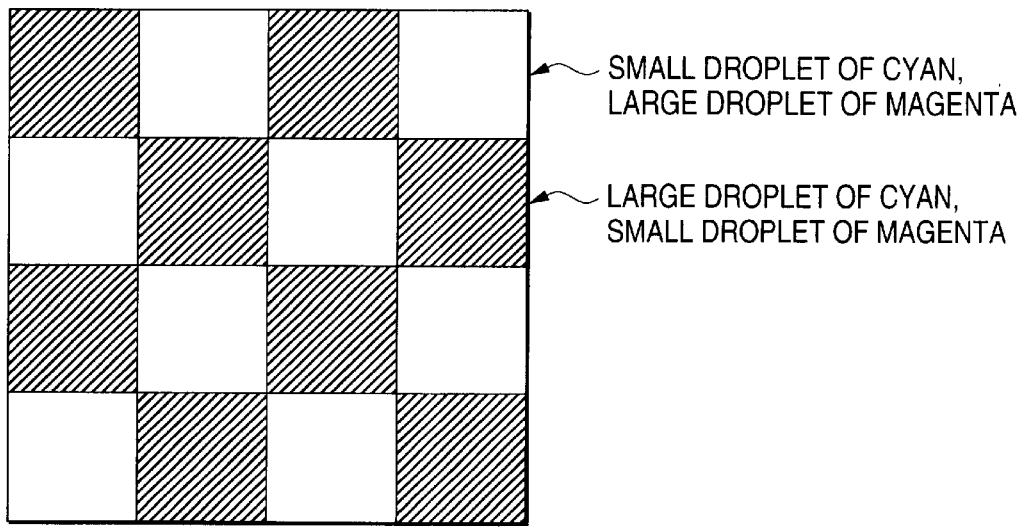
FIG. 9 is a frame format showing a pattern of a processing result when size is changed with threshold, 7 or lower and 8 and higher, in the Bayer type dither matrix.

Assume that the dot size is a large droplet for both cyan and magenta as a result of the quantization process in Step S62. FIG. 8 shows an example of the two-dimensional matrix used in this embodiment. FIG. 8 shows a Bayer type dither matrix. The dot size for cyan is changed from large droplet to small droplet when coordinates in an image and its corresponding value in FIG. 8 are associated with each other with assuming that the matrix shown in FIG. 8 is laid on the image like a tile block and the value shown in FIG. 8 is not larger than 7. In this case, the dot size for magenta is not changed. On the other hand, the dot size for magenta is changed from large droplet to small droplet when coordinates in an image and its corresponding value in FIG. 8 are similarly associated with each other and the value shown in FIG. 7 is not smaller than 8. In this case, the dot size for cyan is not changed. As a result, as shown in FIG. 9, a combination of the large droplet of cyan and a combination of the small droplet of cyan and the large droplet of magenta are arranged in a staggered manner. Therefore, the large droplet of cyan and the large droplet of magenta are prevented from overlapping each other on one and the same pixel.

In such a manner, any one of the large droplet of cyan and the large droplet of magenta is changed into a small droplet so as to reduce the area where cyan and magenta overlap each other, that is, to reduce the area where the hue changes due to the order in which the inks are landed. In addition, such a change into a small droplet is applied to cyan and magenta equally and uniformly in a pixel matrix as a whole. Thus, the macroscopic hue is equal to that in the case of large droplet of magenta and small droplet of cyan. When an ensemble of a large number of minute pixels including a plurality of colors are looked from a normal visual distance by naked eye, the ensemble is recognized a single color due to the integration effect of naked eye. The macroscopic hue refers to the hue of this single color.

In case of 7 or lower, a large droplet of cyan is changed into a small droplet of cyan and a droplet of magenta is not changed. In case of 8 or higher, a large droplet of magenta is changed into a small droplet of magenta and a droplet of cyan is not changed. In the Bayer type dither matrix shown in FIG. 8, when the processing is performed in accordance with whether the value in the matrix is not larger than 7 like the above described, a pattern of a processing result is a staggered arrangement as shown in FIG. 9. The number of pixels having a large droplet of magenta and a small droplet of cyan is equal to the number of pixels having a small droplet of magenta and a large droplet of cyan. Therefore, the macroscopic hue is equal to a case in which all pixels include a large droplet of magenta and a large droplet of cyan.

Accordingly, when forming a color image on a recording medium while the head repeatedly reciprocate, it is not necessary that a scanning direction of the head is taken into consideration at a time of the quantization of image data. In addition, the color shift caused by the difference in color order in which a plurality of dots of colors are landed can be reduced and quality of an image can be improved. Also, the color shift caused by the difference in color order in which the dots are landed can be reduced with image size not being changed and small reduction in density.

Figure 10:
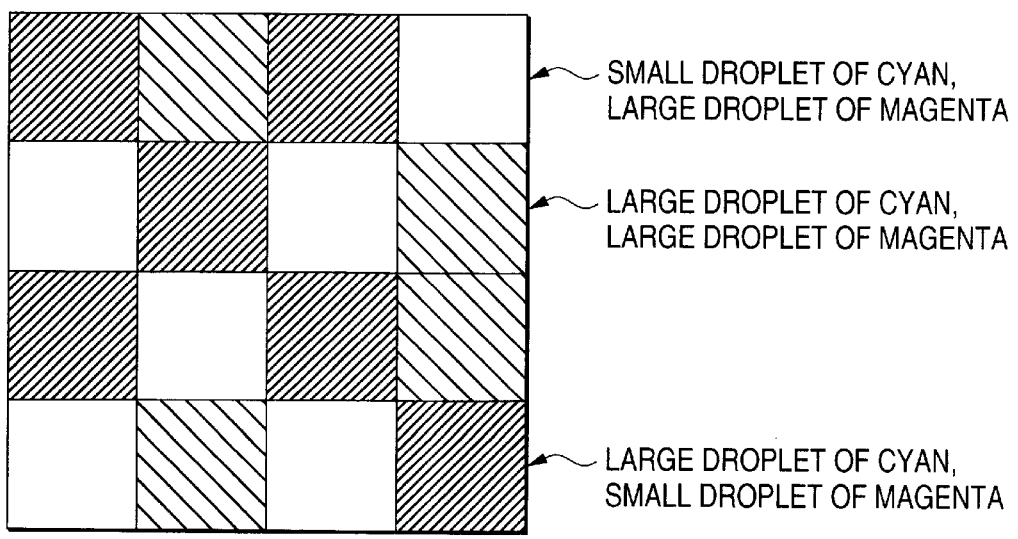
FIG. 10 is a frame format showing a pattern of a processing result when size is changed with threshold, 5 or lower and 10 or higher, in the Bayer type dither matrix.
Figure 11:
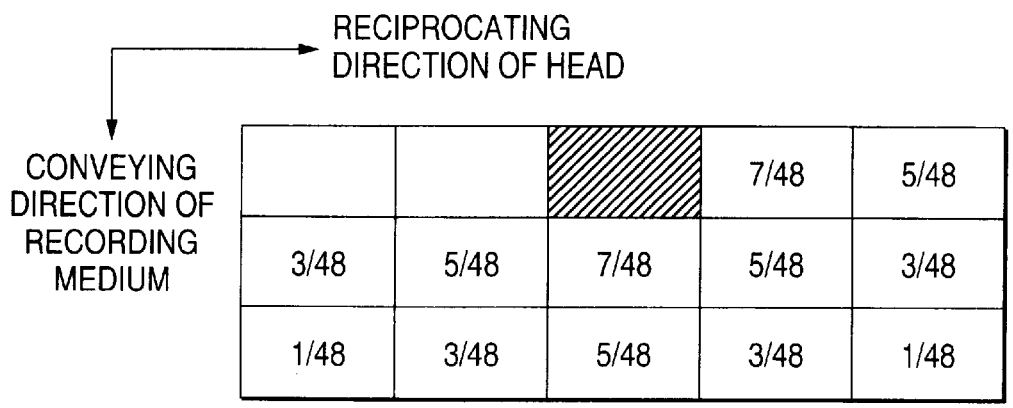
FIG. 11 is a plan view showing an embodiment of weighting.

Incidentally, the invention is not limited to this example so long as the macroscopic hue is not changed. For example, a two-dimensional matrix such as a blue noise mask other than the Bayer type dither matrix shown in FIG. 8 may be used. The processing may employ different threshold values, 5 or less and 10 or more. In the Bayer type dither matrix shown in FIG. 8, a processing according to the following rules. In a case of 5 or less, a large droplet of cyan is change to a small droplet of cyan and a droplet of magenta is not changed and in a case of 10 or more, a large droplet of magenta is changed to a small droplet of magenta and a droplet of cyan is not changed. FIG. 10 shows a pattern of a processing result. In this case, the macroscopic hue is equal to the case in which all pixels include a large droplet of magenta and a large droplet of cyan.

After carrying out the process to determine an output dot for each color, the control/operation portion 13 converts the data into a data format that can be processed by the printer (Step S65), and transfers the converted data to the printer. Thus, the quantization process is terminated.

Thus, by use of the recording apparatus capable of multi-gradation recording as in the first embodiment of the invention, large droplets of a plurality of colors can be prevented from overlapping one another on one and the same pixel. When dots of a plurality of colors composing one pixel are different in density, the influence of the color forming a dot with high density becomes strong. For example, the influence of cyan becomes strong in a pixel composed of a large droplet of cyan and a small droplet of magenta, while the influence of magenta becomes strong in a pixel composed of a small droplet of cyan and a large droplet of magenta. This does not depend on the order in which those droplets are landed on a recording medium. It is therefore possible to reduce the color shift caused by the difference between the dot landing order when the recording head scans in the forward direction and the dot landing order when the recording head scans in the reverse direction.

In addition, when the dot conversion method as described in the first embodiment of the invention is used, pixels influenced strongly by cyan and pixels influenced strongly by magenta appear alternately. Such a change of density in a high frequency component cannot be distinguished by human sight. Thus, there is no fear that the change of density degrades the visible image quality.

Further, when the difference of dot density is attained by area coverage modulation, the area where dots overlap each other is reduced so that the influence on color shift caused by the difference of the order in which the dots are landed is reduced. It is therefore possible to reduce such color shift.

Furthermore, it is not necessary to take the scanning direction of the head into consideration when the quantization and/or the color conversion is performed and an entire image is processed in a batch manner. Therefore, the processing cost can be reduced.

In the first embodiment of the invention, description has been made on the method in which color shift caused by the difference of the order in which dots of cyan and magenta are landed is reduced by changing one of the dots into a dot having lower density than a quantization result if the kinds of the dots are identical. However, even when the kinds of the dots of cyan and magenta are identical as a result of the quantization process, the quantization result does not have to be always changed when the dots have low density. In other words, among the kinds of dots, which the head can produce, the above described process may be performed with respect to only a pixel in which dots having high density are used for two or more colors. For example, no change may be applied when the dot size is a small droplet in both cyan and magenta as a result of quantization. Choice whether a change should be applied or not depends on the characteristic of the recording head, the characteristic of the inks, the relationship between the inks and the recording medium, and so on. Alternatively, such a method may be adopted that the choice is left to user's discretion.

In other words, when the density of a dot is high, the color shift caused by the difference in color order in which the inks are landed is conspicuous. On the contrary, when the density of a dot is low, even if the color shift caused by the difference in color order in which the inks are landed is caused, it is difficult to recognize the color shift and the color shift has a little effect on the quality of an image. Therefore, the quatization process according to the related art may be performed with regard to a pixel including a dot having low density so that the processing cost can be reduced while the processing speed can be improved. In addition, the color reproduction faithful to an inputted image can be realized.

In addition, when the error diffusion method is used as the quantization method, an output score associated with a first quantization result may be used or an output score associated with an output dot may be used. When the output score is associated with the quantization result, an image true to an input image can be obtained, and a high image quality can be obtained particularly in an area with a large change of density.

On the other hand, when the output score associated with the output dot is used, an error in quantization generated by dot conversion is also diffused into peripheral pixels with weighting as shown in FIG. 8, so that a high image quality can be attained without changing the density of an image as a whole. Thus, this manner is effective particularly in an area with a small change of density.

In addition, description in the first embodiment of the invention has been made by use of a two-dimensional matrix to change the quantization result to determine an output dot. However, there are some changing methods other than the method using the two-dimensional matrix, such as a method using a numerical expression based on coordinates information in an image, a method for determining an output dot from dots of respective colors obtained as a result of quantization, and a method for determining an output dot from a combination of dots in adjacent pixels. Alternatively, a plurality of changing methods including these methods may be prepared so that only one kind of changing method can be selected in accordance with the color properties on the recording medium. The color properties on the recording medium depends on the properties of the head, the properties of the inks, and a relationship between the inks and the recording medium. Therefore, a plurality of processes for selecting dots are provided like this so that the most optimum process can be selected under various conditions.

<Second Embodiment>

Next, description will be made on the quantization process.

The hardware configuration of the printing apparatus performing the quantization process according to the second embodiment of the invention is similar to the configuration according to the first embodiment of the invention shown in FIG. 4. Description will be made on the case where four kinds of colors (that is, cyan, magenta, yellow and black) are used by way of example. In addition, an example of area coverage modulation in which the dot size is changed will be used for description of the realization of gradation. However, there may be used a method utilizing density modulation in which the ink density or the like is changed. Four kinds of dot sizes (that is, small droplet, middle small droplet, middle large droplet and large droplet) are used here.

Figure 12:
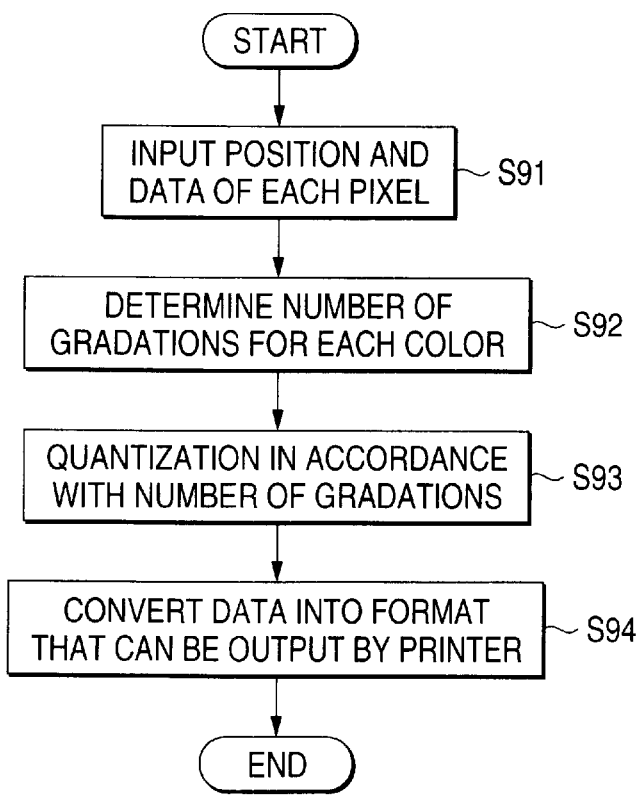
FIG. 12 is a flow chart showing a quantized data generating process routine according to a second embodiment of the invention.

FIG. 12 is a flow chart showing a quantized process according to the second embodiment of the invention. The control/operation portion 13 acquires a position (coordinates in an image) and its corresponding color-converted data for every pixel (Step S91).

Next, the control/operation portion 13 determines the number of gradations for every color of the pixel (Step S92). On this occasion, the number of gradations is determined from position (coordinates) information for every color of each pixel with reference to a predetermined table as will be described later. This table may be stored in a memory for execution processing in advance or may be read from an external storage unit.

Figures 13, 14:
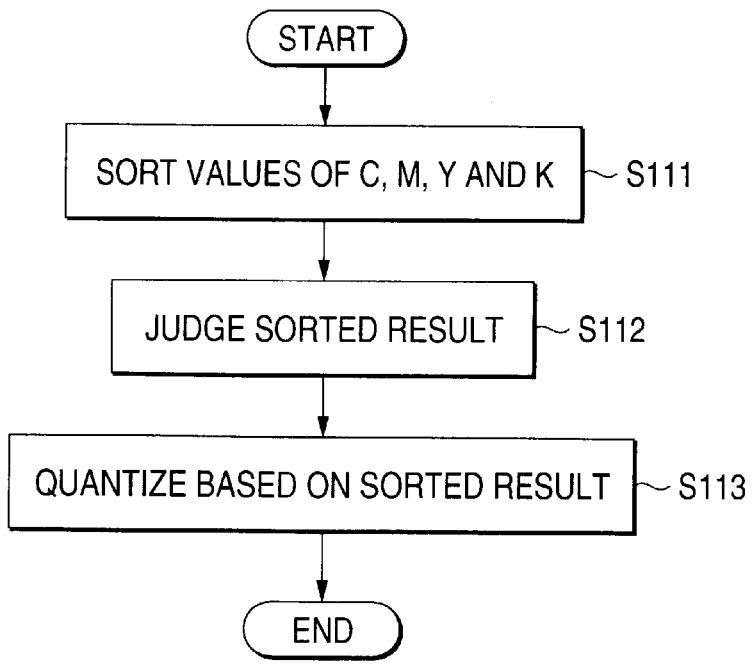
FIG. 13 is a plan view showing an embodiment of a reference table for determining the number of gradations.
FIG. 14 is a flow chart showing a method for determining a quantized value from an input data value for each color.

FIG. 13 is a view showing an embodiment of the table. First, target pixels are classified into four kinds of groups in accordance with the position (coordinates) information with reference to a two-dimensional table (two-dimensional matrix) shown in FIG. 8. In this case, 0–3 belong to Group 0, 4–7 belong to Group 1, 8–11 belong to Group 2, and 12–15 belong to Group 3. In each group, the kind of dot with highest expressible density for each color is limited. FIG. 10 shows that the kind of dot with highest expressible density for cyan in Group 0 is a dot with "highest" density of all the kinds of dots that the head can form. That is, dots ranging from no droplet to large droplet can be formed for cyan. In the same manner, small droplet is the kind of dot with highest expressible density for magenta; middle large droplet of yellow; and middle small droplet, for black.

When the dot with highest expressible density is determined, the number of gradations is also determined. For example, when the dot with highest expressible density is small droplet, the number of gradations is two, including no droplet and small droplet. In addition, when the dot with highest expressible density is large droplet, the number of gradations is five, including no droplet, small droplet, middle small droplet, middle large droplet and large droplet. Quantization is performed thus in accordance with the number of gradations corresponding to the kind of dot with highest expressible density (Step S93). After the quantization is terminated, the data is converted into a data format which can be output by the printer (Step S94). The converted data is transferred to the printer. Then, the quantization process is terminated.

In the second embodiment of the invention, the highest density for each color can be controlled by use of an apparatus capable of multi-gradation recording. The effect obtained by preventing dots with particularly high density for a plurality of colors from overlapping each other is just as described in the first embodiment of the invention.

Although the kind of dot with highest density for one color is set to be different from that for another color in the second embodiment of the invention described above, there may be colors having one and the same kind of dot with highest density. It is, however, desired to avoid using a high density dot in common to a plurality of colors, but to use a low density dot in common to a plurality of colors. This reason is as follows. That is, when the density is low, color shift even caused by the difference in landing order is rarely recognized visually so that the influence of the color shift on the image quality is small. On the contrary, when the density is high, color shift caused by the difference in landing order is apt to be conspicuous.

For example, in a recording head capable of forming two kinds of dots (that is, small droplet and large droplet) to be expressible with three gradations, assume that a quantization process with three gradations (that is, no droplet, small droplet and large droplet) is applied to only cyan while a quantization process with two gradations (that is, no droplet and small droplet) is applied to other colors. When one kind of dot with highest expressible density is used thus in common to a plurality of colors, the necessary number of gradations can be reduced. In this case, it is possible to suppress the cost for controlling the recording head or the like.

On the contrary, the number of gradations may be made larger than 5 gradations in the embodiment. In this case, the quantization, which have been carried out with two gradations in the embodiment, can be carried out with three or more gradations. The number of gradations for others can be increased in the same manner. It is therefore possible to improve the image quality.

In the second embodiment according to the invention, a two-dimensional matrix as shown in FIG. 8 is used to determine the number of gradations and the kind of dot with highest expressible density for each color. Besides this method, there are some methods, such as a method using a numerical expression to make such determination, a method taking into consideration the kinds of dots used in adjacent pixels to make such determination, and a method making such determination on the basis of an input data value for each color. In any of these methods, it will go well if the kind of dot with highest density, of the kinds of dots that the recording head can form, is limited to one color of a plurality of colors forming one pixel.

An example of the method making determination on the basis of an input data value for each color will be described below with reference to the flow chart of FIG. 14. Assume that four dot sizes including small droplet, middle small droplet, middle large droplet and large droplet, are used here.

First, values of the respective colors (C, M, Y and K) subjected to the color conversion process are sorted (Step S111), and the sorted result is judged (Step S112). In the judgement of the sorted result made here, the kind of dot with highest expressible density for each color is determined one the basis of the sorted result, and the number of gradations is set in accordance with the kind of dot with highest expressible density. Next, a quantization process with the number of gradations set for each color is carried out based on the judgement of the sorted result (Step S113).

For example, assume that the values of the respective colors after the color conversion are 250 for cyan, 200 for magenta, 50 for yellow and 100 for black. When those values are sorted in descending order, cyan, magenta, black and yellow line up in that order. On the assumption that the density becomes higher as the value increases, it is preferable that setting is done so that the density of a dot becomes higher for a color having a larger value. Accordingly, in this case, the kind of dot with highest expressible density and the number of gradations for each color are large droplet and 5 gradations for cyan, large middle droplet and 4 gradations for magenta, small droplet and 2 gradations for yellow, and middle small droplet and 3 gradations for black. A quantization process based on these numbers of gradations is carried out.

<Third Embodiment>

Next, description will be made on the quantization process according to a third embodiment of the invention.

The hardware configuration of the printing apparatus performing the quantization process according to the third embodiment of the invention is just as shown in FIG. 2, which is similar to the configuration according to the first embodiment of the invention. Description will be made on the case where a secondary color formed of cyan and magenta is used by way of example. In addition, although the third embodiment of the invention will be described on the case for area coverage modulation, the invention is also applicable to the case for density modulations different in density per unit area. Assume that two kinds of dot sizes (that is, small droplet and large droplet) are used here, and three-gradation expression including no droplet is made.

A combination of dots of the respective colors is determined not to match with the combination of dots in a pixel adjacent to a pixel to be subjected to quantization, for example, in a pixel subjected to the last quantization. Assume that the combination of dots in the adjacent pixel is large droplet of cyan and small droplet of magenta. In this case, quantization is carried out to avoid the combination of large droplet of cyan and small droplet of magenta as the combination of dots in the pixel to which the quantization will be applied. In other words, the quantization process is carried out so that a color forming a dot having highest density in one and the same pixel is prevented from agreeing with a color forming a dot having highest density in a pixel adjacent to the pixel in an upper direction, a left direction, or each of the upper direction and the left direction.

As for the quantization method on this occasion, a quantization result obtained by quantization applied to each of cyan and magenta may be applied to a predetermined rule so as to determine an output dot as in the first embodiment of the invention. Alternatively, quantization maybe carried out after the number of gradations and the kind of dot with highest expressible density are determined as in the second embodiment of the invention. In either case, quantization is carried out so that combinations of dots in adjacent pixels are not identical with each other, A color, which will have a strong influence, if a plurality of colors overlap one another is prevented from agreeing with the color in an adjacent pixel. In other words, since a dot having highest density within a pixel is dominant for color of the pixel, dots having highest density in adjacent pixels are made different in color from each other so that the color being dominant in one pixel does not appear continuously. Whereby, an area where a specific color has a strong influence can be prevented from occurring. As a result, it is possible to lessen the color shading and reduce color shift caused by the difference in landing order.

Although the recording head forms two kinds of dots (that is, small droplet and large droplet) in the third embodiment of the invention, the number of combinations of dots forming one pixel will increase if the number of kinds of dots the recording head can form increases. Accordingly, a large number of combinations of dots different from the combination of dots in an adjacent pixel can be provided so that it becomes easy to make it difficult to continue a dominant color in one pixel. As a result, there is shown abetter effect on reduction in color shading caused by the difference in landing order.

<Fourth Embodiment>

Next, description will be made on the quantization process according to a fourth embodiment of the invention.

The hardware configuration of a printing apparatus performing the quantization process according to the fourth embodiment of the invention is just as shown in FIG. 2, which is similar to the configuration according to the first embodiment. The fourth embodiment is different from the first embodiment in that a quantization method is used so that the quantity of an ink shot per pixel is limited to make it difficult for inks of a plurality of colors to overlap one another in one and the same pixel.

First, quantization into four values, for example, using no droplet, small droplet, middle droplet and large droplet is carried out as usual. After that, replacement is applied to the combination of dots as to pixels having a large quantity of an ink shot per pixel. FIG. 15 shows the method of that replacement. FIG. 15 shows a correspondence relationship among combinations of three dots before the replacement, combination of three dots after the replacement, and occurrence ratio of the replacement results.

That is, dots are replaced in accordance with the ratio in the rightmost column in FIG. 15. For example, when the combination of dots before replacement is (large, large, small), replacement is made so that the combination of dots (middle, middle, small) and the combination of dots (middle, middle, none) appear in the ratio of 1:1 after the replacement. The method for replacing the combination of dots is set so that the maximum shot quantity is limited to about 24 [pl], and the difference between the hue before the dot replacement and the hue after the dot replacement is made as small as possible. Incidentally, the ratio (proportion) of the combinations of dots after the replacement shown in FIG. 15 is obtained by an experiment in advance.

By such setting as described above, the quantity of an ink shot per pixel is limited so that inks of a plurality of colors are difficult to overlap one another in one and the same pixel. Thus, the change in hue in bi-directional recording can be reduced.

Although description in the embodiments was made on an example of a printer of an ink jet system provided with piezoelectric elements, the invention is also applicable to various printers and other printing apparatuses including a printer for ejecting inks by means of bubbles generated in inks near nozzles. In addition, the invention is also applicable to any printing apparatus other than printers so long as it is an apparatus for expressing an image while dots are allocated to each pixel.

The printing apparatus described above includes processing using a computer. Therefore, various recording media that the computer can read can be used as embodiments of the recording medium storing a program for executing such processing. Examples of such recording media include a flexible disc medium, a CD-ROM, anon-magnetic disc, an IC card, an ROM cartridge, a punch card, a print in which codes such as bar cords have been printed, an internal storage unit of the computer (memory such as RAM or ROM) and an external recording unit, In addition, it is possible to adopt a form of a program supply unit for supplying a computer program for executing the image processing described above to the computer through a communication pathway.

Description has been made above on the embodiments of the invention. However, the invention is not limited to the embodiments. The invention can be carried out in various modes without departing from the scope and spirit of the invention. For example, various control processes described in the embodiments may be realized partially or wholly by hardware.

According to the invention, the quantization is carried out so that when two or more kinds of dots for different colors are superimposed on one and the same pixel, the number of pixels in which at least one dot is different from dots for other colors in kinds is higher than the number of pixels in which dots having the same kind are superimposed and the macroscopic hue is identical with the case in which dots having the same kind are superimposed in all pixels. Whereby, it can be prevented dots for a plurality of colors having the same kind from being superimposed on the one and same pixel. When dots, which form one pixel, for a plurality of colors are different in kind, a color forming a large dot or a dot having high density becomes to have a strong influence. Therefore, color order in which inks are landed on a recording medium is not depended. Accordingly, when a color image is formed on a recording medium while a head repeatedly reciprocate, it is not necessary take a scanning direction of the head into account and the color shift caused by the difference in color order in which dots for a plurality of colors are landed is reduced without changing an image size and with a little reduction in density so that the quality of an image can be improved.

As is apparent from the description, the invention includes a recording head capable of forming two or more kinds of dots different in density per unit area for every single color by means of area coverage modulation, density modulation or mixture of those gradations; an input process for inputting image data having a gradation value for every pixel; a process for carrying out quantization such that the kind of dot for at least one color is made different from the kind of dot for another color in one and the same pixel when two or more kinds of dots for different colors are superimposed on the pixel; a process for recording on a recording medium based on a quantization result while reciprocating the recording head. The invention reduces color shift caused by the difference between the ink landing order when the head reciprocates outward and the ink landing order when the head reciprocates homeward.

When dots of respective colors composing one pixel are different in density, the influence of the color forming a dot with high density becomes strong. This does not depend on the dot loading order on the recording medium. According to the invention, it is therefore possible to reduce the color shift caused by the difference between the dot landing order when the recording head scans outward and the dot landing order when the recording head scans homeward.

In addition, when the difference of dot density is attained by area coverage modulation; the area where dots overlap each other is reduced so that the influence on color shift caused by the difference of the dot landing order is reduced. It is therefore possible to reduce such color shift.

In addition, it is not necessary to take the scanning direction of the head into consideration when quantization or color conversion is carried out, and one and the same processing is applied to the whole of an image. It is therefore possible to reduce the processing cost.

In addition, according to the invention, a process for making control to apply processing to only pixels where a dot with high density of kinds of dots the head can form is used for two or more kinds of colors.

When the dot density is high, color shift caused by the difference in landing order is apt to be conspicuous. On the contrary, when the density is low, color shift even caused by the difference in landing order is rarely recognized visually so that the influence of the color shift on the image quality is small. Thus, when a quantization process in the related art is applied to pixels composed of dots with low density, it is possible to reduce the processing cost while it is possible to improve the processing speed. In addition, color true to an input image can be reproduced.

In addition, the invention further provides a process for making control such that a color forming a dot highest in density in one and the same pixel is prevented from agreeing with a color forming a dot highest in density in a pixel adjacent to the pixel in an upper direction, a left direction, or each of the upper direction and the left direction.

A dot with highest density in one and the same pixel is dominant in the color of the pixel. By making the color of the dot with highest density different from that in an adjacent pixel, the dominant color is prevented from appearing continuously in one pixel. As a result, it is possible to reduce color shift caused by the difference in dot landing order.

Further, the invention further prepares two or more kinds of methods for selecting at least one dot in one and the same pixel, and provides a process for selecting one of the methods in accordance with the color property on a recording medium.

The color property on the recording medium depends on the characteristic of the head, the characteristic of inks, the relationship between the inks and the recording medium, and so on, When a plurality of dot selecting processes are provided, it is possible to select a most suitable process under various conditions.

What is claimed is:

1. A recording apparatus comprising:
   a recording head capable of forming a plurality of kinds of dots, which are different from each other in density, per unit area for every single color by means of at least one of area coverage modulation and density modulation, the recording head ejecting a plurality of colors;
   an input section for inputting image data having a gradation value for every pixel; and
   a quantization section for quantizing the inputted image data so that:
      number of pixels in which the kind of dot for at least one color is different from the kinds of dots for the other colors in one and the same pixel is higher than number of pixels on which dots having the same kind are superimposed; and
      macroscopic hue is equal to a case in which dots having the same kind are superimposed in all pixels,
   wherein the recording head is reciprocated to record on a recording medium based on a quantization result obtained by the quantization section.

2. The recording apparatus according to claim 1, wherein the quantization section quantizes the inputted image data so that the number of pixels in which the kind of dot for at least one color is different from the kinds of dots for the other colors in one and the same pixel is higher than number of pixels in which dots each having higher density than a predetermined density are superimposed.

3. The recording apparatus according to claim 1, wherein the quantization section quantizes the inputted image data so that the pixels in which the kind of dot for at least one color is different from the kinds of dots for the other colors in one and the same pixel is not arrange in a deviation manner.

4. The recording apparatus according to claim 1, wherein the quantization section quantizes the inputted image data so that the pixels in which the kind of dot for at least one color is different from the kinds of dots for the other colors in one and the same pixel are arranged two-dimensionally without deviation while number of dots for each color in the pixels and number of dots for each kind in the pixels are not changed.

5. The recording apparatus according to claim 1, wherein the quantization section carries out second quantization by redetermining a kind of dot for each color with reference to a first quantization result.

6. The recording apparatus according to claim 5, wherein in the second quantization, a kind of dot for each color is redetermined based on a dot redetermination ratio, which is prepared in advance, so that the macroscopic hue is equal to the case in which dots having the same kind are superimposed in all pixels.

7. A method for recording in a recording apparatus having a recording head capable of forming a plurality of kinds of dots, which are different from each other in density, per unit area for every single color by means of at least one of area coverage modulation and density modulation, the recording head ejecting a plurality of colors, the method comprising the steps of:
   inputting image data having a gradation value for every pixel;
   carrying out quantization so that:
      number of pixels in which the kind of dot for at least one color is different from the kinds of dots for the other colors in one and the same pixel is higher than number of pixels on which dots having the same kind are superimposed; and
      macroscopic hue is equal to a case in which dots having the same kind are superimposed in all pixels; and
   recording on a recording medium based on a quantization result obtained by the quantization step while reciprocating the recording head.

8. The method according to claim 7, wherein the quantization step quantizes the inputted image data so that the number of pixels in which the kind of dot for at least one color is different from the kinds of dots for the other colors in one and the same pixel is higher than number of pixels in which dots each having higher density than a predetermined density are superimposed.

9. The method according to claim 7, wherein the quantization step quantizes the inputted image data so that the pixels in which the kind of dot for at least one color is different from the kinds of dots for the other colors in one and the same pixel is not arrange in a deviation manner.

10. The method according to claim 7, wherein the quantization step quantizez the inputted image data so that the pixels in which the kind of dot for at least one color is different from the kinds of dots for the other colors in one and the same pixel are arranged two-dimensionally without deviation while number of dots for each color in the pixels and number of dots for each kind in the pixels are not changed.

11. The method according to claim 7, wherein the quantization step carries out second quantization by redetermining a kind of dot for each color with reference to a first quantization result.

12. The method according to claim 11, wherein in the second quantization, a kind of dot for each color is redetermined based on a dot redetermination ratio, which is prepared in advance, so that the macroscopic hue is equal to the case in which dots having the same kind are superimposed in all pixels.

13. A program for a recording apparatus having a recording head capable of forming a plurality of kinds of dots, which are different from each other in density, per unit area for every single color by means of at least one of area coverage modulation and density modulation, the recording head ejecting a plurality of colors, the program making the recording apparatus execute the steps of;

inputting image data having a gradation value for every pixel;

carrying out quantization so that:

number of pixels in which the kind of dot for at least one color is different from the kinds of dots for the other colors in one and the same pixel is higher than number of pixels on which dots having the same kind are superimposed; and macroscopic hue is equal to a case in which dots having the same kind are superimposed in all pixels; and recording on a recording medium based on a quantization result obtained by the quantization step while reciprocating the recording head.

14. The program according to claim 13, wherein the quantization step quantizes the inputted image data so that the number of pixels in which the kind of dot for at least one color is different from the kinds of dots for the other colors in one and the same pixel is higher than number of pixels in which dots each having higher density than a predetermined density are superimposed.

15. The program according to claim 13, wherein the quantization step quantizes the inputted image data so that the pixels in which the kind of dot for at least one color is different from the kinds of dots for the other colors in one and the same pixel is not arrange in a deviation manner.

16. The program according to claim 13, wherein the quantization step quantizez the inputted image data so that the pixels in which the kind of dot for at least one color is different from the kinds of dots for the other colors in one and the same pixel are arranged two-dimensionally without deviation while number of dots for each color in the pixels and number of dots for each kind in the pixels are not changed.

17. The program according to claim 13, wherein the quantization step carries out second quantization by redetermining a kind of dot for each color with reference to a first quantization result.

18. The program according to claim 17, wherein in the second quantization, a kind of dot for each color is redetermined based on a dot redetermination ratio, which is prepared in advance, so that the macroscopic hue is equal to the case in which dots having the same kind are superimposed in all pixels.

* * * * *

UNITED STATES PATENT AND TRADEMARK OFFICE
CERTIFICATE OF CORRECTION

PATENT NO.    : 6,749,280 B2
DATED         : June 15, 2004
INVENTOR(S)   : Tohru Shimizu et al.

It is certified that error appears in the above-identified patent and that said Letters Patent is hereby corrected as shown below:

<u>Title page,</u>
Item [30], Foreign Application Priority Data, insert as follows:

-- (30)    Foreign Application Priority Data
      December 14, 2001  (JP)  Japan    2001-381672 --

Signed and Sealed this

Twelfth Day of October, 2004

JON W. DUDAS
*Director of the United States Patent and Trademark Office*